United States Patent Office 2,951,889
Patented Sept. 6, 1960

2,951,889

ISOMERIZATION OF PARAFFIN HYDROCARBONS

Marcellus J. Geerts, Evanston, and Hillis O. Folkins, Crystal Lake, Ill., assignors to The Pure Oil Company, Chicago, Ill., a corporation of Ohio No Drawing. Filed Dec. 16, 1955, Ser. No. 553,418

5 Claims. (Cl. 260—683.66)

This invention relates to the isomerization of paraffinic hydrocarbons. It is especially concerned with improving the efficiency of isomerization processes wherein normal paraffinic hydrocarbons are processed in the presence of catalytic compositions comprising boron fluoride and hydrogen fluoride.

Because of the increased demand for high octane motor fuels for use in modern high-output, high-speed, spark-ignited internal combustion engines having a high octane number requirement, considerable attention has been given to processes for upgrading low octane number, straight-run distillates boiling in the naphtha range for use as gasoline motor fuel blending stocks. Because high octane-yield relationships are obtained by using isomerization processes, this type of reaction can be used to effect this objective. Considerable work has been carried out in the development of isomerization processes. Although theoretical discussions of the reaction mechanism indicate that Friedel-Crafts type catalysts, such as anhydrous aluminum chloride and boron fluoride, in conjunction with anhydrous hydrogen chloride and anhydrous hydrogen fluoride, respectively, and other active metal halides and corresponding halogen acids, are suitable for providing catalyst compositions for isomerization reactions, commercial processes employing catalyst compositions of this nature have limited the application of Friedel-Crafts type catalysts to aluminum chloride, promoted with anhydrous hydrogen chloride. Investigation of liquid phase isomerization of various paraffinic hydrocarbon feed stocks has shown that the liquid phase isomerization of low molecular weight, normal paraffinic hydrocarbons in the presence of a catalyst composition comprising variable concentrations of boron fluoride and hydrogen fluoride has a number of advantages. Qualitatively, the octane number improvement is greater than that produced with a similar composition containing aluminum chloride and hydrogen chloride, and less disproportionation to low molecular weight hydrocarbons accompanies the production of the stabilized liquid product than occurs with the aluminum chloride-hydrogen chloride catalyst composition.

Because catalyst compositions comprising Friedel-Crafts catalysts are also active cracking promoters, it has been found necessary, in order to improve the life of the catalyst composition and decrease the amount of gaseous products produced, to carry out the isomerization process in the presence of a cracking suppressant to reduce the cracking to a minimum. The suppression of cracking in isomerization processes has been extensively investigated and there is described in the prior art, inter alia, a number of aromatic hydrocarbons which can be employed as cracking suppressants or inhibitors for use in processes utilizing catalyst compositions containing Friedel-Crafts catalysts. These include benzene, alkyl derivatives thereof, polynuclear aromatics having at least two monocyclic aryl nuclei, or polynuclear aromatic hydrocarbons of the fused-ring type. Although there is described broadly the use of these cracking suppressants with catalyst compositions containing Friedel-Crafts catalysts, in general, the reported experimental data show the use of these disclosed cracking suppressors only in combination with aluminum chloride catalyst compositions. It has been found that generalizations cannot be made, and that the effectiveness of cracking inhibitors in isomerization processes is specific to the catalysts used.

It is therefore an object of this invention to provide a process, wherein cracking is suppressed, for isomerizing low molecular weight, normal, paraffinic hydrocarbons by means of Friedel-Crafts type catalyst compositions comprising an admixture of boron fluoride and hydrogen fluoride in the presence of a nucleophilic reagent which suppresses cracking without inimically affecting the activity of the catalyst composition for isomerization. This and other objects will become more apparent from the following detailed description of this invention.

According to this invention, it has been found that cracking may be suppressed in the isomerization of low molecular weight, normal paraffinic hydrocarbons by catalyst compositions containing boron fluoride and hydrogen fluoride by carrying out the process in the presence of small amounts of durene (1,2,4,5-tetramethyl benzene) at temperatures of about 0–200° C. It has been found that while durene will function to inhibit cracking without deleteriously affecting the activity of the catalyst composition for isomerization, other aromatic hydrocarbons in conjunction with boron fluoride-hydrogen fluoride catalyst compositions substantially inhibit the isomerization activity of the catalyst composition.

To illustrate the instant invention, the effects of a number of nucleophilic reagents in suppressing decomposition reactions during the isomerization process were investigated. Nucleophilic reagents are those having electron-rich centers of reactivity and which show a readiness to give up the excess electrons, in whole or in part, under proper conditions. In carrying out the reactions, measured amounts of n-heptane, anhydrous hydrogen fluoride and a nucleophilic reagent were charged to a bomb-type reactor which was immersed in an ice-water bath. The bomb was closed, pressured with a measured amount of boron fluoride, agitated, and heated to and maintained at reaction temperature for a specified time. When the reaction was complete, the bomb was cooled to room temperature, reduced to atmospheric pressure and emptied. Reduction of the bomb pressure to atmospheric pressure was accomplished by releasing gaseous materials from the bomb into a purification and recovery system which included an aqueous scrubber for the removal of boron fluoride and/or hydrogen fluoride from the effluent gas, a drying tube containing a solid desiccant, a cold-trap maintained at approximately $-78°$ C. for collecting condensable products from the effluent gas, and a gas-collection receptacle for collecting the remaining components of the effluent gas. The reaction mixture remaining in the reactor consisted of a stabilized hydrocarbon isomerate phase and a dense catalyst phase. The volume of each phase was measured immediately after the reaction mixture was transferred from the bomb to a recovery system wherein the isomerized product was isolated.

A summary of the results of the effect of various nucleophilic reagents for suppressing decomposition reactions during the isomerization of normal heptane with catalyst compositions containing boron fluorine and hydrogen fluoride is given in Table I.

tile cracked products increased to 9.8 wt. percent and the hydrocarbon charge complexed in the catalyst phase increased to 5.3 wt. percent.

In addition to suppressing disproportionation, durene

TABLE I
*Isomerization of heptane with boron fluoride and hydrogen fluoride, in presence of nucleophilic reagents*

| Run | Catalyst Mole/Mole n-C$_7$ | | Nucleophilic Reagent | | Reaction Conditions | | Yield Reaction Products (No. Losss Basis, Wt. percent) | | | Isomerate Product | |
|---|---|---|---|---|---|---|---|---|---|---|---|
| | BF$_3$ | HF | Reagent | Amount Mole/Mole n-C$_7$ | Time (Hrs.) | Temp. (°C.) | Volatile Product | Isomerate Product | Product from Complex | Gravity (°API) | Octane No. (ORC-F-1 Blended)$^a$ |
| A | 0.07 | 0.54 | None | | 3 | 125 | 5.7 | 86.0 | 8.3 | | |
| B | 0.22 | 0.58 | None | | 1 | 125 | 17.5 | 72.0 | 10.5 | | |
| C | 0.07 | 0.53 | Durene | 0.07 | 3 | 125 | 0.3 | 97.7 | 2.0 | | $^b$61.0 |
| D | 0.22 | 0.58 | Mesitylene | 0.07 | 1 | 125 | 0.4 | 94.2 | 5.4 | 75.1 | $^c$52.7 |
| E | 0.22 | 0.59 | Benzene | 0.08 | 1 | 125 | 0.4 | 97.8 | 1.8 | 72.9 | $^d$54.0 |
| F | 0.22 | 0.55 | Durene | 0.07 | 1 | 125 | 2.4 | 90.6 | 7.0 | 73.3 | 58.5 |

$^a$ Equal volume blend of isomerate product and isoctane; Octane No. of an equal volume blend of n-heptane and isooctane= 50.
$^b$ Blank with durene, 54.7.
$^c$ Blank with mesitylene, 52.3.
$^d$ Blank with benzene, 52.8

From this table it is seen that the catalytic effect of the catalyst compositions containing boron fluoride and hydrogen fluoride produced greater selectivity in the presence of durene, especially when low concentrations of boron fluoride are employed. This is illustrated by a comparison of Runs A (without durene) and C (with durene) shown in Table I. Run C shows that a 97.7 wt. percent yield of stable isomerate liquid, having an octane number of 61 (octane number of blend of isomerate product and isooctane), was produced in the presence of durene. Under the same operating conditions, Run A demonstrates that selectivity was impaired giving only an 86.0 wt. percent yield of isomerate liquid product which contained products lighter than C$_7$ hydrocarbons from cracking. In addition, 5.7 wt. percent of light, volatile products was isolated and 8.3 wt. percent of hydrocarbon charge was complexed in the catalyst phase.

At a given level of octane quality of product (blended octane number of 61), the presence of durene effected a yield of isomerate liquid product of 97.7 wt. percent, while in the absence of durene a yield of only 93.7 wt. percent was obtained At the higher boron fluoride concentration, durene was also effective in suppressing disproportionation. A comparison of Runs B (without durene) and F (with durene), included in Table I, shows that the action of durene reduced volatile product from 17.5 wt. percent to 2.4 wt. percent; increased, correspondingly, the yield of isomerate product from 72.0 wt. percent to 90.6 wt. percent and produced octane improvement which approached the maximum octane improvement due to isomerization, as disproportionation was reduced and yield of product was increased to theoretical. Thus, the action of boron fluoride and hydrogen fluoride promotes disproportionation simultaneously with isomerization in the absence of cracking suppressor.

At concentrations of about 22 mole percent boron fluoride and 150 mole percent hydrogen fluoride, at 125° C., the effect of durene to improve the octane-yield relationship was also demonstrated when straight run naphtha from East Texas crude, having an A.S.T.M. boiling range of 104–200° F. and a clear octane number of 66.5, was isomerized. A 91.2 wt. percent yield of stable isomerate liquid, having a clear octane number of 73.5, was produced in the presence of durene. In addition, 6.0 wt. percent of light, volatile cracked products was isolated and 2.8 wt. percent of hydrocarbon charge was included in the catalyst phase. In the absence of durene, the yield of stable isomerate liquid, having a clear octane number of 73.2 was reduced to 84.9 wt. percent while light, volatile cracked products increased to 9.8 wt. percent and the hydrocarbon charge complexed in the catalyst phase increased to 5.3 wt. percent.

In addition to suppressing disproportionation, durene also reduced formation of catalyst complex which removed hydrocarbons that also contribute to octane improvement from the isomerate product.

Nucleophilic reagents, such as benzene and mesitylene (1,3,5-trimethyl benzene), inhibit the catalytic activity of boron fluoride and hydrogen fluoride, even at high boron fluoride concentration as indicated by Runs D and E. Other nucleophilic reagents which inhibit the activity of boron fluoride and hydrogen fluoride include sulfur dioxide and magnesium.

In preparing the boron fluoride-hydrogen fluoride catalyst compositions of this invention, suitable concentrations of catalyst components based on the hydrocarbon charge include 1–25 mol percent of boron fluoride and 10–200 mol percent of hydrogen fluoride. The catalytic activity of the catalyst compositions containing boron fluoride is dependent upon the presence of hydrogen fluoride. A minimum concentration of hydrogen fluoride based on hydrocarbon charge of about 10 mole percent is required to promote activity of boron fluoride, regardless of the concentration of boron fluoride. Higher concentrations of boron fluoride require less acid in excess of the minimum than lower concentrations to attain a given activity. The concentration of the catalyst composition and the relative concentration of the component parts of the catalyst composition will vary according to the molecular weight of the hydrocarbon employed as a feed stock. In general, smaller concentrations of boron fluoride, with the minimum concentration of hydrogen fluoride, will be required for the isomerization of the lower molecular weight hydrocarbons. Durene is employed in concentrations from about 0.4–15 mole percent based on the hydrocarbon charge, preferably in the range of 0.4–5.0 mole percent. However, depending upon operating conditions, amounts outside these ranges may be employed.

Reactions are carried out in the liquid phase at temperatures between about 0–200° C. Contact times may vary widely, depending upon the nature of the charge stock and the extent of agitation or mixing. In general, contact times of about 0.1–3 hours are suitable. In carrying out the isomerization process of this invention, a variety of normal paraffinic feed stocks may be employed. These may consist of pure paraffinic hydrocarbons or synthetic or natural admixtures thereof. The invention has specific application in the treatment of hydrocarbons boiling in the light gasoline range in order to effect an improvement in their octane number. However, in general, feed stocks containing isomerizable, saturated, paraffinic hydrocarbons, having not more than ten carbon

We claim as our invention:

1. A process for the liquid phase isomerization of a feed stock containing an isomerizable, saturated paraffinic hydrocarbon having not more than about 10 carbon atoms per molecule, which comprises contacting the feed stock at a temperature of about 0–200° C. with a boron fluoride-hydrogen fluoride catalyst composition in the presence of about 0.4–15 mole percent of durene, based on said feed stock, said catalyst containing 1 to 25 mole percent of boron fluoride and 10 to 200 mole percent of hydrogen fluoride, based on the hydrocarbon charge stock.

2. A process for the liquid phase isomerization of a feed stock containing normal heptane, which comprises contacting the feed stock at a temperature of about 0–200° C. with a boron fluoride-hydrogen fluoride catalyst composition in the presence of about 0.4–5 mole percent of durene, based on said feed stock, said catalyst containing 1 to 25 mole percent of boron fluoride and 20 to 200 mole percent of hydrogen fluoride, based on the feed stock.

3. A process in accordance with claim 2 in which said contacting is carried out at about 125° F., in the presence of 5–10 mole percent, based on the feed stock, of durene, employing a catalyst composition comprising about 7–10 mole percent of boron fluoride, and 50–60 mole percent of hydrogen fluoride, based on the feed stock.

4. A process for increasing the octane number of a petroleum distillate having an A.S.T.M. end point of about 250° F. and lower, and containing isomerizable, saturated paraffinic hydrocarbons which comprises contacting said distillate under isomerizing conditions with a boron fluoride-hydrogen fluoride catalyst composition in the presence of about 0.4–15 mole percent of durene, based on said distillate, said catalyst containing 1 to 25 mole percent of boron fluoride and 10 to 200 mole percent of hydrogen fluoride, based on the hydrocarbon feed stock.

5. A process for increasing the octane number of a petroleum distillate having an A.S.T.M. end point of about 250° F. and lower, and containing isomerizable, saturated paraffinic hydrocarbons which comprises contacting said distillate at a temperature of 0–200° C. with a boron fluoride-hydrogen fluoride catalyst composition in the presence of about 0.4–15 mole percent of durene, based on said distillate, said catalyst containing 1 to 25 mole percent of boron fluoride and 10 to 200 mole percent of hydrogen fluoride, based on the hydrocarbon charge stock.

References Cited in the file of this patent

UNITED STATES PATENTS

| | | |
|---|---|---|
| 2,446,998 | Burk | Aug. 17, 1948 |
| 2,461,545 | Hepp | Feb. 15, 1949 |
| 2,461,598 | Gibson | Feb. 15, 1949 |

OTHER REFERENCES

Frankenburg et al., "Advances in Catalysis," vol. VI, Academic Press Inc., New York (1954), pages 197–198.